(12) United States Patent
Nagai et al.

(10) Patent No.: US 8,830,385 B2
(45) Date of Patent: Sep. 9, 2014

(54) DRIVE UNIT, LENS MODULE, AND IMAGE PICKUP UNIT

(75) Inventors: Nobuyuki Nagai, Kanagawa (JP); Takehisa Ishida, Tokyo (JP); Yusaku Kato, Tokyo (JP); Hideo Kawabe, Saitama (JP); Masayoshi Morita, Tokyo (JP)

(73) Assignee: Sony Corporation, Tokyo (JP)

( * ) Notice: Subject to any disclaimer, the term of this patent is extended or adjusted under 35 U.S.C. 154(b) by 59 days.

(21) Appl. No.: 13/590,445

(22) Filed: Aug. 21, 2012

(65) Prior Publication Data

US 2013/0057756 A1   Mar. 7, 2013

(30) Foreign Application Priority Data

Aug. 29, 2011   (JP) ................. 2011-185529

(51) Int. Cl.
  *H04N 5/232* (2006.01)
  *H04N 5/225* (2006.01)
  *G02B 7/02* (2006.01)
  *G02B 7/08* (2006.01)

(52) U.S. Cl.
  CPC ............... *G02B 7/08* (2013.01); *H04N 5/2257* (2013.01)
  USPC ............................ 348/357; 348/374; 359/824

(58) Field of Classification Search
  CPC ............ H04N 5/2254; H04N 5/23212; H04N 5/2253; H04N 5/23287; H04N 5/23283; G02B 7/08; G02B 7/102
  USPC .................................. 348/357, 374; 359/824
  See application file for complete search history.

(56) References Cited

U.S. PATENT DOCUMENTS

| 7,504,608 | B2 * | 3/2009 | Klein .......................... 250/201.1 |
| 2007/0122132 | A1 * | 5/2007 | Misawa et al. ................. 396/55 |
| 2009/0147340 | A1 * | 6/2009 | Lipton et al. .................. 359/230 |
| 2009/0225453 | A1 * | 9/2009 | Chang ........................... 359/824 |
| 2010/0232034 | A1 * | 9/2010 | Polyakov et al. ............. 359/694 |

FOREIGN PATENT DOCUMENTS

| JP | 2006-172635 | 6/2006 |
| JP | 2006-293006 | 10/2006 |

* cited by examiner

*Primary Examiner* — Twyler Haskins
*Assistant Examiner* — Quang Le
(74) *Attorney, Agent, or Firm* — Sony Corporation

(57) ABSTRACT

A drive unit includes: a holding member holding an object to be driven; a polymer actuator device provided on one side of the object to be driven; one or more supporting members provided on the other side of the object to be driven; and a fixing member directly or indirectly fixing a first end of each of the polymer actuator device and the supporting members. A second end of each of the polymer actuator device and the supporting members is directly or indirectly connected to an end of the holding member.

17 Claims, 11 Drawing Sheets

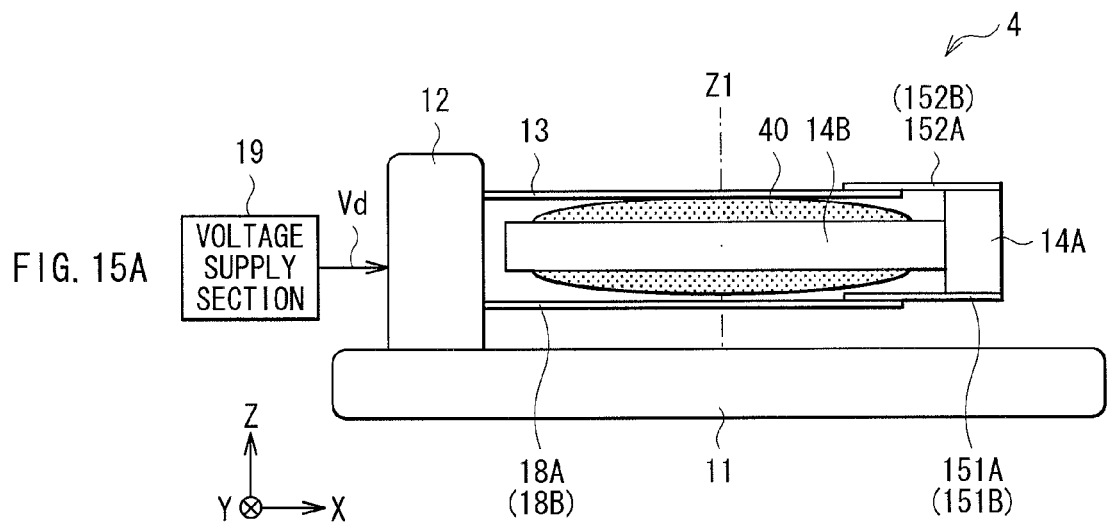
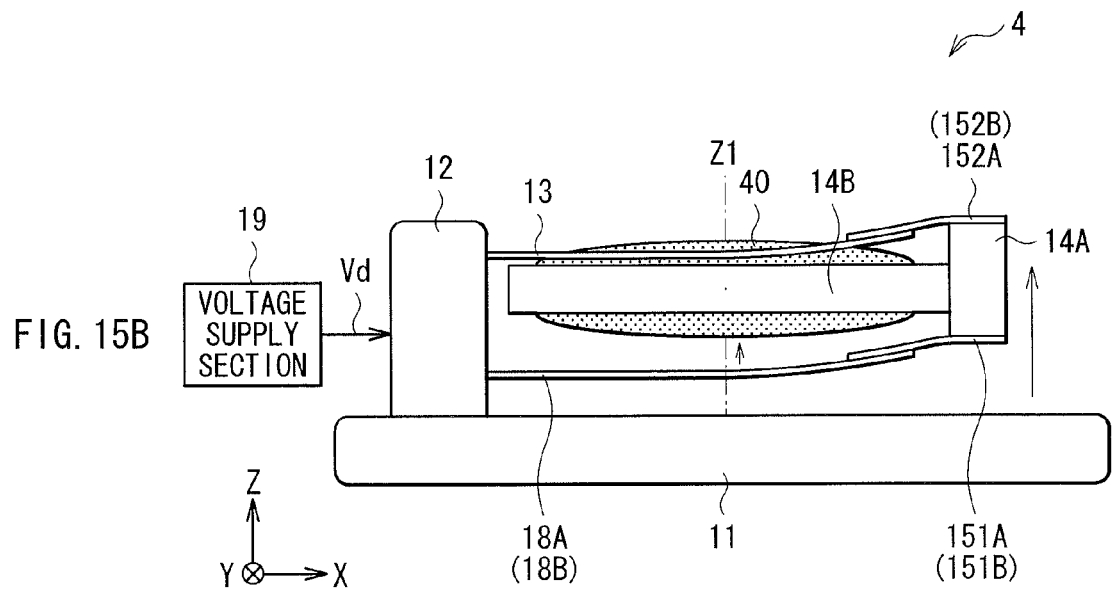

DRIVE UNIT, LENS MODULE, AND IMAGE PICKUP UNIT

BACKGROUND

This disclosure relates to a drive unit using a polymer actuator device, and a lens module and an image pickup unit which are provided with the drive unit.

In recent years, for example, portable electronic units such as a mobile phone, a personal computer (PC), and a PDA (Personal Digital Assistant) have become remarkably multi-functional, and the portable electronic unit with a lens module thereby having an image pickup function has become general. In such portable electronic units, focusing and zooming are performed by moving a lens in the lens module in an optical axis direction.

In general, the lens in the lens module is typically moved by using a voice coil motor or a stepping motor as a drive section. Meanwhile, recently, a unit employing a predetermined actuator device as a drive section has been developed from the viewpoint of miniaturization. Examples of such an actuator device include a polymer actuator device (see, for example, Japanese Unexamined Patent Application Publications No. 2006-293006 and No. 2006-172635). The polymer actuator device is a device in which, for example, an ion-exchange resin film is interposed between a pair of electrodes. In the polymer actuator device, the ion-exchange resin film is displaced in a direction orthogonal to a film surface, due to occurrence of a potential difference between the pair of electrodes.

SUMMARY

In the drive unit (for example, a lens drive unit) using such a polymer actuator device, in related art, an object to be driven (for example, a lens) is difficult to be moved with high accuracy. Therefore, a method of improving such a circumstance is desirably proposed.

It is desirable to provide a drive unit, a lens module, and an image pickup unit which are capable of moving an object to be driven with high accuracy.

According to an embodiment of the disclosure, there is provided a drive unit including: a holding member holding an object to be driven; a polymer actuator device provided on one side of the object to be driven; one or more supporting members provided on the other side of the object to be driven; and a fixing member directly or indirectly fixing a first end of each of the polymer actuator device and the supporting members. A second end of each of the polymer actuator device and the supporting members is directly or indirectly connected to an end of the holding member.

According to an embodiment of the disclosure, there is provided a lens module including a lens and a drive unit driving the lens. The drive unit includes: a holding member holding the lens; a polymer actuator device provided on one side of the lens; one or more supporting members provided on the other side of the lens; and a fixing member directly or indirectly fixing a first end of each of the polymer actuator device and the supporting members. A second end of each of the polymer actuator device and the supporting members is directly or indirectly connected to an end of the holding member.

According to an embodiment of the disclosure, there is provided an image pickup unit including a lens, an image pickup device acquiring an image pickup signal imaged by the lens, and a drive unit driving the lens. The drive unit includes: a holding member holding the lens; a polymer actuator device provided on one side of the lens; one or more supporting members provided on the other side of the lens; and a fixing member directly or indirectly fixing a first end of each of the polymer actuator device and the supporting members. A second end of each of the polymer actuator device and the supporting members is directly or indirectly connected to an end of the holding member.

In the drive unit, the lens module, the image pickup unit according to the embodiments of the disclosure, the second end side (a movable side) of the polymer actuator device is deformed, and in association therewith, the second end side of the supporting members is also deformed. Therefore, the holding member is driven, and the object to be driven becomes movable (displaceable). In this case, the polymer actuator device is provided only on one side of the object to be driven (the polymer actuator device is not provided on the other side of the object to be driven). Consequently, for example, unlike the case where a plurality of polymer actuator devices is used, characteristic variation (variation of a deformation amount and the like) does not occur between the plurality of devices, and thus the object to be driven is easily moved while maintaining the parallel state.

In the drive unit, the lens module, the image pickup unit according to the embodiments of the disclosure, the polymer actuator device is provided on the one side of the object to be driven, and the supporting members are provided on the other side of the object to be driven. Therefore, the object to be driven becomes easily movable while maintaining the parallel state. Consequently, the object to be driven is allowed to be moved with high accuracy.

It is to be understood that both the foregoing general description and the following detailed description are exemplary, and are intended to provide further explanation of the technology as claimed.

BRIEF DESCRIPTION OF THE DRAWINGS

The accompanying drawings are included to provide a further understanding of the disclosure, and are incorporated in and constitute a part of this specification. The drawings illustrate embodiments and, together with the specification, serve to explain the principles of the technology.

FIGS. 15A and 15B are side-surface schematic diagrams each illustrating an operation of the lens module according to the embodiment illustrated in FIG. 5.

DETAILED DESCRIPTION

Figure 1:
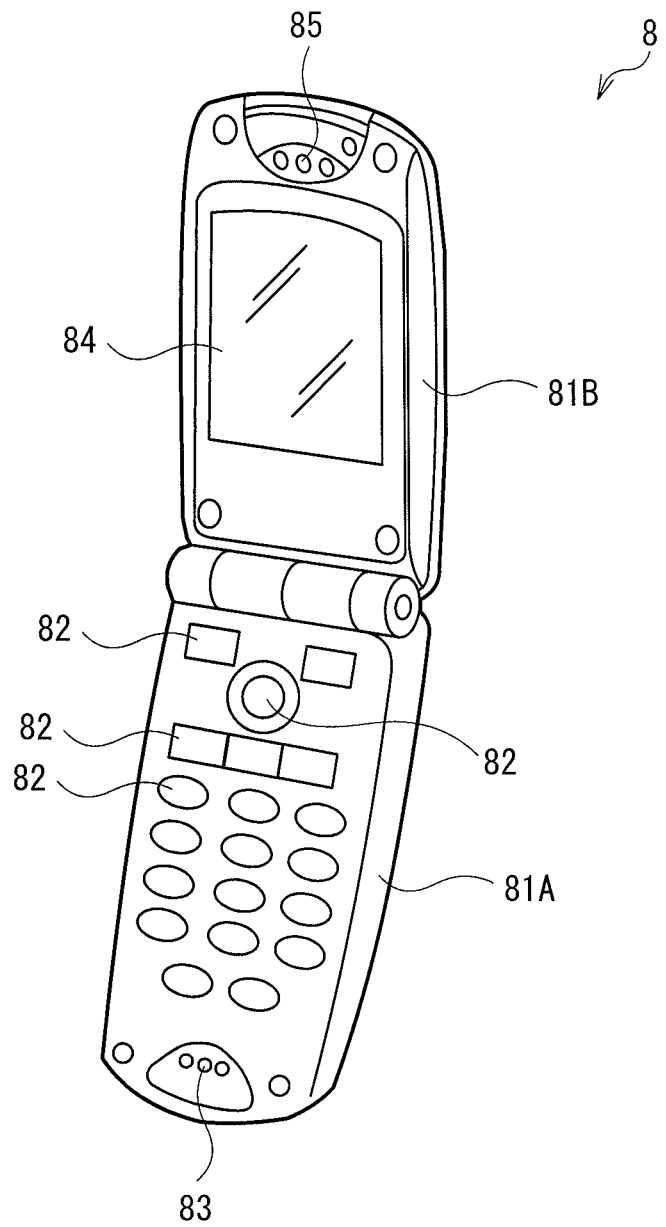
FIG. 1 is a perspective view illustrating a configuration example of an electronic unit provided with an image pickup unit according to an embodiment of the disclosure.
Figure 2:
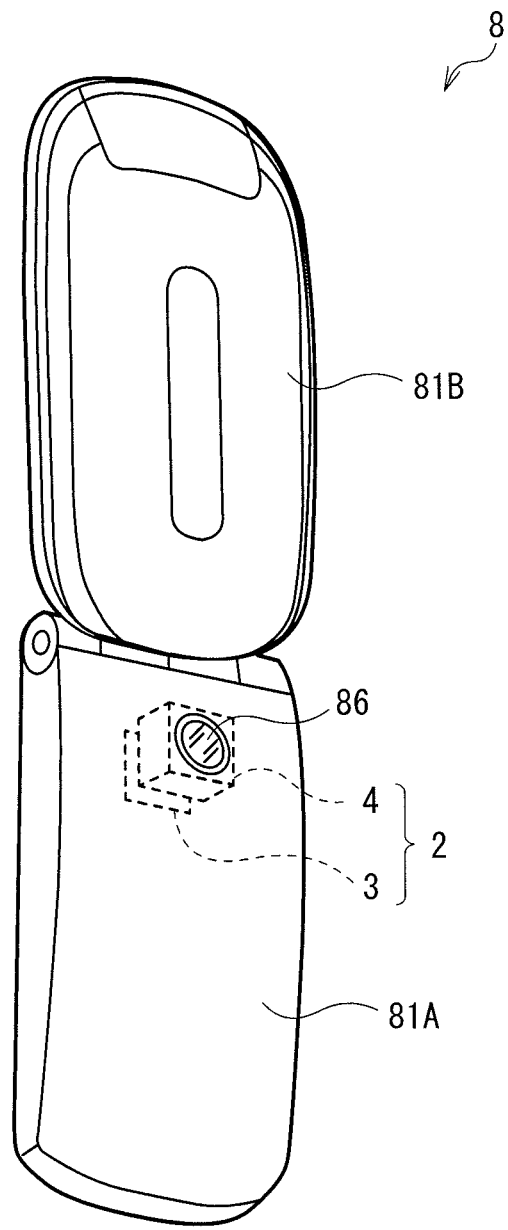
FIG. 2 is a perspective view illustrating the electronic unit illustrated in FIG. 1, in a different direction.

Hereinafter, a preferred embodiment of the disclosure will be described in detail with reference to drawings. Note that descriptions will be given in the following order.
1. Embodiment (Example of a lens drive unit using a polymer actuator device)
2. Modifications Embodiment Schematic Configuration of Electronic Unit with Image Pickup Unit FIG. 1 and FIG. 2 are perspective views each illustrating a schematic configuration of a mobile phone (a mobile phone 8) with an image pickup function as an example of an electronic unit with an image pickup unit (an image pickup unit 2 described later) according to an embodiment of the disclosure. In the mobile phone 8, two housings 81A and 81B are foldably coupled with each other through a hinge section (not illustrated).

As illustrated in FIG. 1, various operation keys 82 are disposed on one surface of the housing 81A, and a microphone 83 is disposed at the lower end thereof. The operation keys 82 are provided to receive predetermined operation by a user and input information. The microphone 83 is provided to input voice of the user during a call and the like.

As illustrated in FIG. 1, a display section 84 using a liquid crystal display panel and the like is disposed on one surface of the housing 81B, and a speaker 85 is disposed at the upper end thereof. The display section 84 displays various kinds of information such as a radio-wave receiving status, a remaining battery, a telephone number of a party on the other end of connection, contents (telephone numbers, names, and the like of other parties) recorded as a telephone directory, an outgoing call history, and an incoming call history. The speaker 85 is provided to output voice and the like of a party on the other end of connection during a call and the like.

As illustrated in FIG. 2, a cover glass 86 is disposed on the other surface of the housing 81A, and the image pickup unit 2 is provided at a position corresponding to the cover glass 86 in the housing 81A. This image pickup unit 2 is configured by a lens module 4 disposed on an object side (the cover glass 86 side), and an image pickup device 3 disposed on an image side (inside of the housing 81A). The image pickup device 3 is a device acquiring an image pickup signal imaged by a lens (a lens 40 described later) in the lens module 4. This image pickup device 3 is configured by using an image sensor mounted with a charge coupled device (CCD), a complementary metal oxide semiconductor (CMOS), or the like.

Configuration of Image pickup Unit 2 and Lens Module 4

Figure 3:
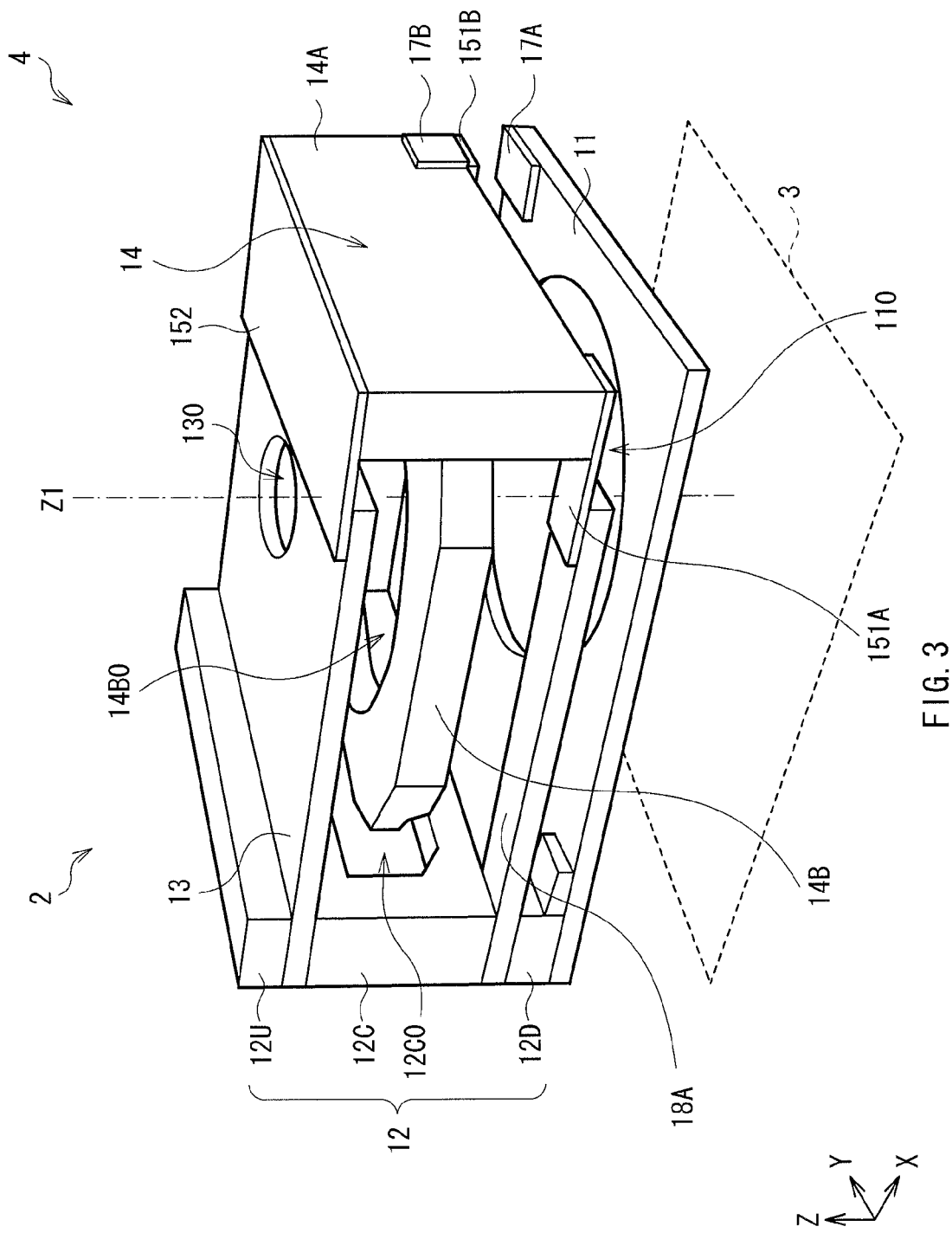
FIG. 3 is a perspective view illustrating a configuration of a main part of the image pickup unit illustrated in FIG. 2.
Figure 4:
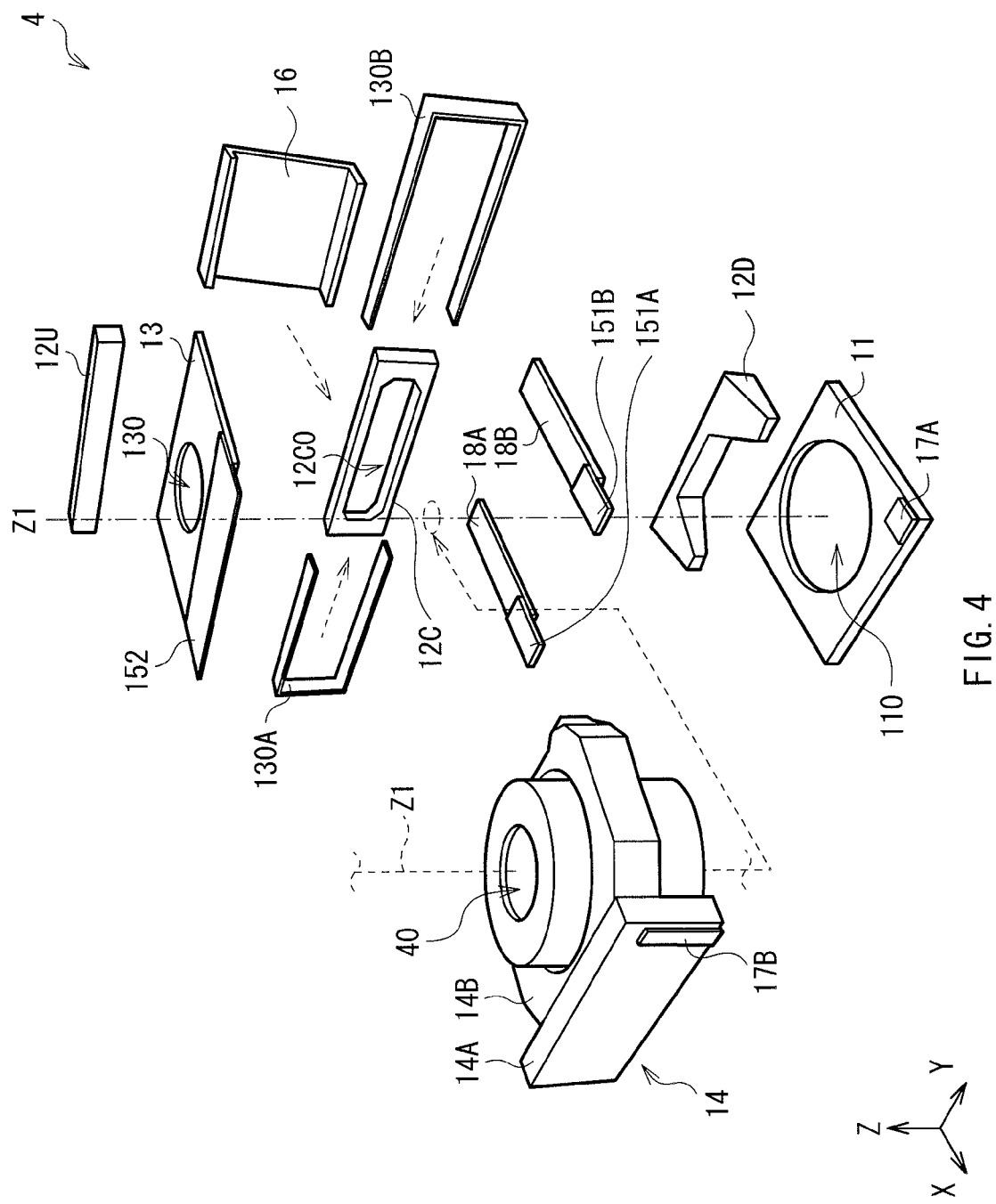
FIG. 4 is an exploded perspective view illustrating a lens module illustrated in FIG. 3.
Figure 5A:
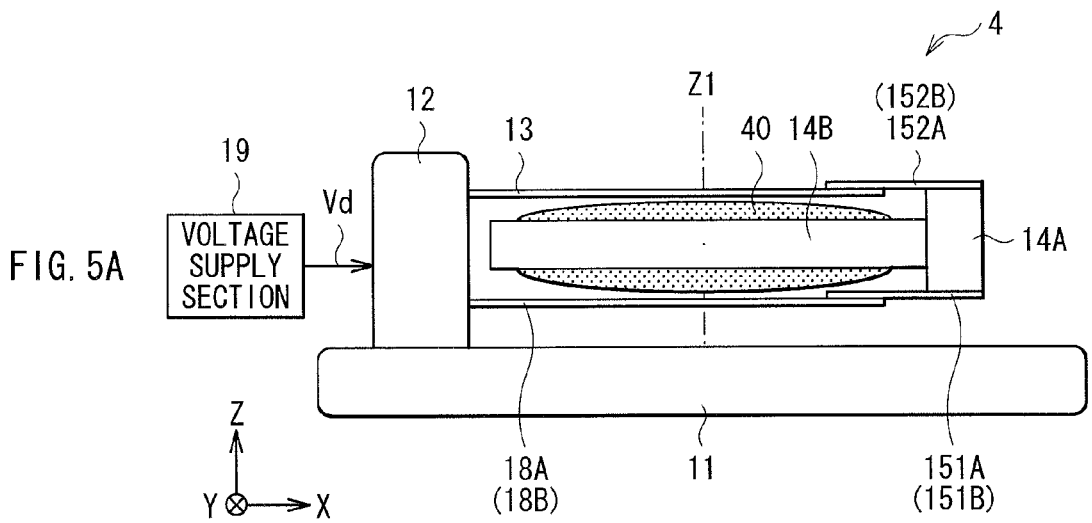
FIGS. 5A and 5B are schematic diagrams illustrating a side surface configuration and a plan configuration, respectively, of the lens module illustrated in FIG. 3.
Figure 5B:
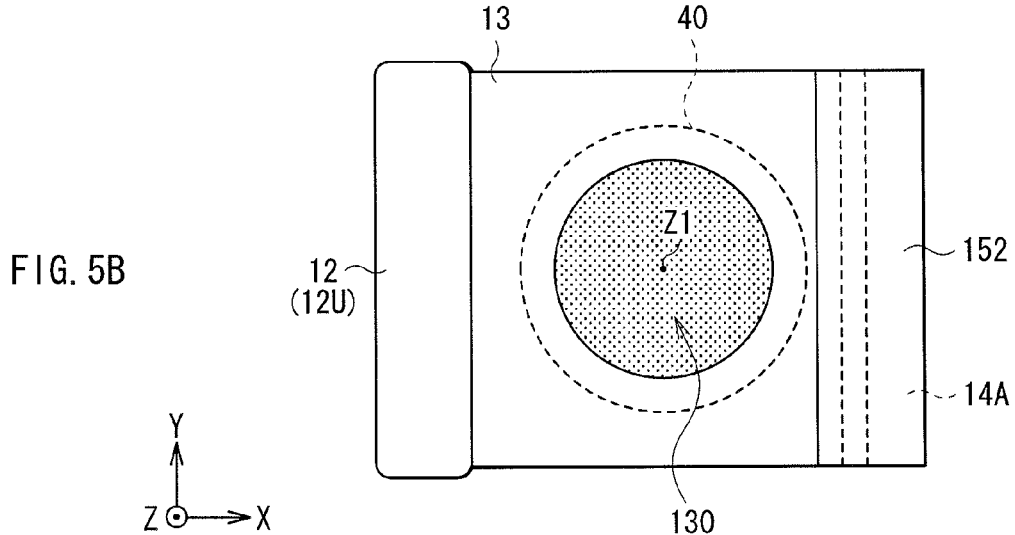

FIG. 3 is a perspective view illustrating a configuration of a main part of the image pickup unit 2, and FIG. 4 is an exploded perspective view illustrating a configuration of the lens module 4 in the image pickup unit 2. In addition, FIGS. 5A and 5B are a side view (a Z-X side view) and a plan view (an X-Y plan view), respectively, each illustrating schematic configuration of the lens module 4.

The lens module 4 includes a base member 11, supporting members 18A and 18B, a lens holding member 14 (a holding member) and a lens 40 (object to be driven), and a polymer actuator device 13 in order from the image side (the image pickup device 3 side) to the object side along an optical axis Z1 (along a positive direction on the Z-axis). In other words, one polymer actuator device 13 is disposed on one side (herein, an upper side, or the positive direction side of the Z-axis) of the lens 40, and one or more (herein, two) supporting members 18A and 18B are disposed on the other side (herein, a lower side, or a negative direction side of the Z-axis) of the lens 40. Accordingly, a driving surface (an X-Y plane, described later) of the polymer actuator device 13 and supporting surfaces (an X-Y plane, described later) of the supporting members 18A and 18B face to each other along the optical axis Z1 of the lens 40. Note that the lens 40 is not illustrated in FIG. 3. The lens module 4 further includes a fixing member 12, coupling members 151A, 151B, and 152, fixed electrodes 130A and 130B, a pressing member 16, a Hall device 17A, and a magnet 17B. Note that components of the lens module 4 except for the lens 40 correspond to a specific example of "drive unit (lens drive unit)" of the disclosure.

The base member 11 is a member (substrate) supporting the entire lens module 4, and is formed of a hard resin material such as a liquid crystal polymer.

The fixing member 12 is a member directly fixing a first end of the polymer actuator device 13 and a first end of each of the pair of supporting members 18A and 18B, and is formed of a hard resin material such as a liquid crystal polymer. The fixing member 12 includes three members: a lower fixing member 12D, a central (middle) fixing member 12C, and an upper fixing member 12U which are arranged from the image side (a lower part in FIG. 3 and FIG. 4) to the object side (an upper side). The first end of each of the supporting members 18A and 18B and a first end of each of the fixed electrodes 130A and 130B are sandwiched between the lower fixing member 12D and the central fixing member 12C. On the other hand, the first end of the polymer actuator device 13 and the other end of each of the fixed electrodes 130A and 130B are sandwiched between the central fixing member 12C and the upper fixing member 12U. Moreover, among them, in the central fixing member 12C, an opening 12C0 (a second opening) allowing a part of the lens holding member 14 (a part of the holding portion 14B described later) to be partially inserted is formed. Accordingly, the part of the lens holding member 14 is movable in the opening 12C0. This makes it possible to effectively utilize the space and to downsize the lens module 4.

Figure 6:
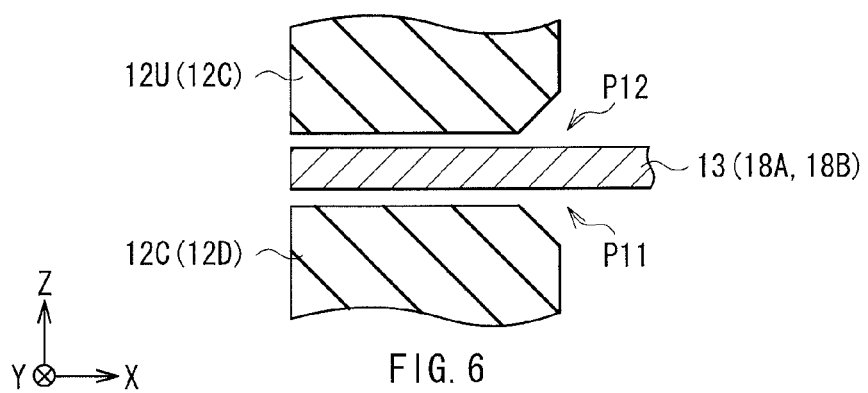
FIG. 6 is a schematic sectional view illustrating a detailed configuration example of a part of fixing members, a polymer actuator device, and a supporting member.

Incidentally, the lower fixing member 12D, the central fixing member 12C, and the upper fixing member 12U each desirably have a cross-sectional shape schematically illustrated in FIG. 6 with a sectional view (Z-X sectional view). In other words, a corner (an edge portion) of each of the lower fixing member 12D, the central fixing member 12C, and the upper fixing member 12U on a side in which each of the polymer actuator device 13 and the supporting members 18A and 18B is to be deformed (curved) is desirably chamfered (refer to portions illustrated by symbols P11 and P12 in FIG. 6). This allows, when being curved, the polymer actuator device 13 and the supporting members 18A and 18B to easily move, and allows scrape, abrasion, and the like caused by the corner to be reduced. As a result, durability of the polymer actuator device 13 and the supporting members 18A and 18B is improved.

The fixed electrodes 130A and 130B supply a drive voltage Vd from a voltage application section (a voltage supply section 19 described later) to electrode films (electrode films 52A and 52B described later) of the polymer actuator device 13. Each of the fixed electrodes 130A and 130B is formed of, for example, gold (Au) or a gold-plated metal, and is shaped like a letter U. This allows each of the fixed electrodes 130A and 130B to hold a top and a bottom (both side surfaces along the Z-axis) of the central fixing member 12C. Therefore, when the fixed electrodes 130A and 130B are formed of a gold-plated metal material, for example, deterioration of contact resistance caused by surface oxidation or the like is allowed to be prevented.

The lens holding member 14 is a member holding the lens 40 to be driven, and is formed of a hard resin material such as a liquid crystal polymer. The lens holding member 14 is disposed to allow the center thereof to be located on the optical axis Z1, and includes a circular holding portion 14B holding the lens 40, and a connection portion 14A. The connection portion 14A holds the holding portion 14B, and connects the holding portion 14B to coupling members 151A, 151B, and 152 which will be described later. The holding portion 14B is disposed between a driving surface (the X-Y plane, described later) of the polymer actuator device 13 and supporting surfaces (the X-Y plane, described later) of the pair of supporting members 18A and 18B.

Polymer Actuator Device 13 and Supporting Members 18A and 18B

Figure 9:
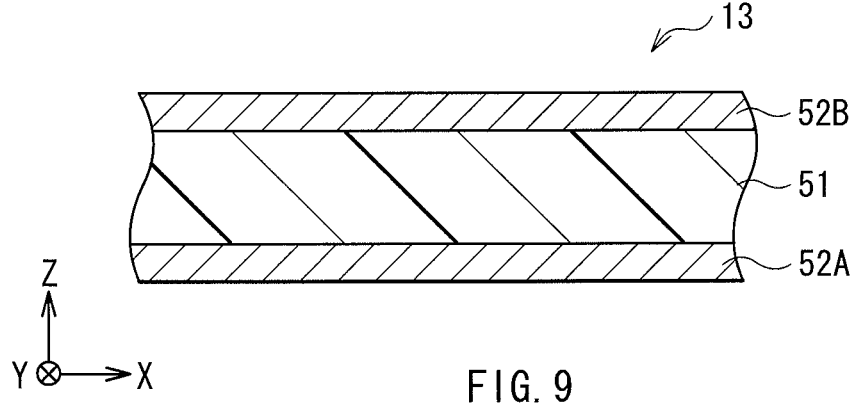
FIG. 9 is a sectional view illustrating a detailed configuration example of the polymer actuator device illustrated in FIG. 3.
Figure 10:
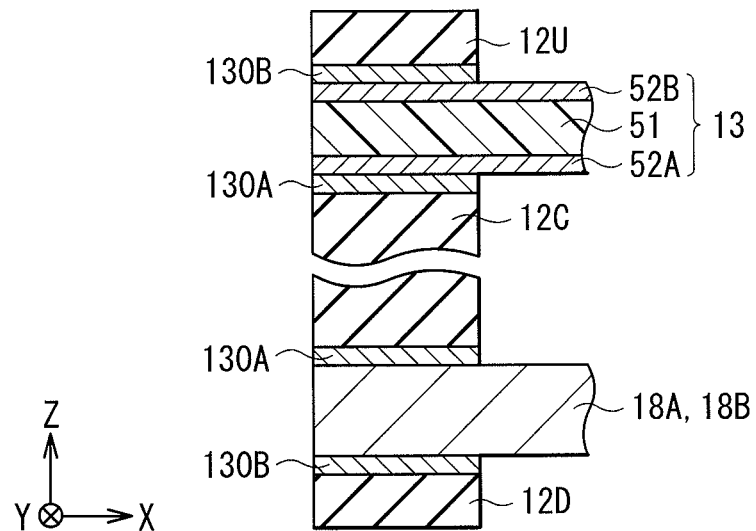
FIG. 10 is a sectional view illustrating a detailed configuration example of a part of the polymer actuator device, the supporting member, the fixing members, and fixed electrodes illustrated in FIG. 3.

The polymer actuator device 13 has a driving surface (a driving surface on the X-Y plane) orthogonal to the optical axis Z1 of the lens 40, and is disposed so that the driving surface faces the supporting surfaces of the pair of the supporting members 18A and 18B (described later) along the optical axis Z1. The polymer actuator device 13 is intended to drive the lens holding member 14 (and the lens 40) along the optical axis Z1 through the coupling members 151A, 151B, and 152 which will be described later. The polymer actuator device 13 has a plate shape extending on the above-described driving surface, and in this example, includes a round-shaped opening 130 (a first opening) as illustrated in FIGS. 3, 4, and 5B. The optical axis Z1 of the lens 40 is located near the center of the opening 130. In other words, the opening 130 is formed in a region opposed to the lens 40, and is a hole allowing image-pickup light to pass therethrough. Note that the detailed configuration of the polymer actuator device 13 will be described later (FIGS. 9 and 10).

Each of the supporting members 18A and 18B supports the other side (a lower end side of the connection portion 14A) of the lens holding member 14, and has a supporting surface (a supporting surface on the X-Y plane) orthogonal to the optical axis Z1 of the lens 40. The supporting members 18A and 18B each have a long and thin rectangular shape in which a long axis direction corresponds to the X-axis direction and a short axis direction corresponds to the Y-axis direction as illustrated in FIG. 4. In addition, the supporting members 18A and 18B are disposed on both ends of the fixing member 12 along the Y-axis direction. The supporting member 18A is connected to the lower end of the connection portion 14A through the coupling member 151A described later, and the supporting member 18B is connected to the lower end of the connection portion 14A through the coupling member 151B.

Such supporting members 18A and 18B are formed of, for example, polyimide, and a rigidity (a bending rigidity) of the supporting members 18A and 18B is desirably substantially equal to (preferably, equal to) a bending rigidity of the polymer actuator device 13. Specifically, a longitudinal elastic modulus (Young's modulus) of the supporting members 18A and 18B is desirably larger than that of the polymer actuator device 13, and the area of the driving surface of the polymer actuator device 13 is desirably larger than the area of the supporting surface of the supporting members 18A and 18B. When a material with a relatively large longitudinal elastic modulus is used for the supporting members 18A and 18B, even if the area of the supporting surface is small (a long and thin rectangle) as illustrated in FIG. 4, for example, a sufficient rigidity (a bending rigidity substantially equal to that of the polymer actuator device 13) is obtainable. In addition, since the area of the driving surface of the polymer actuator device 13 becomes large with the size of the opening 130 as a minimum (as a minute opening allowing image-pickup light to pass therethrough), generative force (deformation amount) and the bending rigidity of the polymer actuator device 13 are further increased, thereby enabling stable operation.

In this example, as the above-described bending rigidity, for example, a spring constant may be used. The spring constant is represented by the following expressions (1) and (2) (JIS Standards: JISB2713, refer to title: the design calculating formulas and the procedures of decision of specifications for flat springs). Note that in the expressions, E indicates a longitudinal elastic modulus (Young's modulus) (kg/cm$^2$), I indicates a second moment of area (=(bh$^3$/12) (cm$^4$)), b indicates a width (a length in the Y-axis direction in this case) (cm), h indicates a thickness (a length in the Z-axis direction in this case) (cm), and L indicates a length (a length in the X-axis direction in this case) (cm).

$$\text{Spring Constant } K=(3EI/L^3) \tag{1}$$

$$\text{Bending Rigidity}=EI(\text{kg·cm}^2) \tag{2}$$

Specifically, in the polymer actuator device 13, when the length L is 6.5 mm, the width b is 7.5 mm, and the thickness h is 0.130 mm, the spring constant K is expressed by, from the expression (1), $3\times5\times10^3\times0.75\times(0.0130)^3/12/(0.65)^3\approx7.5\times10^3$. In addition, in this case, in the supporting members 18A and 18B made of a polyimide film with the length L of 0.65 mm, the thickness h of 0.125 mm, the width b for obtaining the spring constant K substantially equal to that of the polymer actuator device 13 is determined with use of the expression (1) in the following manner. Specifically, (width b of polymer actuator device 13)×(Young's modulus E of polymer actuator device 13/Young's modulus E of polyimide film)× (thickness h of polymer actuator device 13/thickness h of polyimide film)$^3$=0.75×((5×10$^3$)/(3×10$^4$))×(0.130/0.125)$^3\approx$ 0.14 cm (1.4 mm) is established.

Figure 7A:
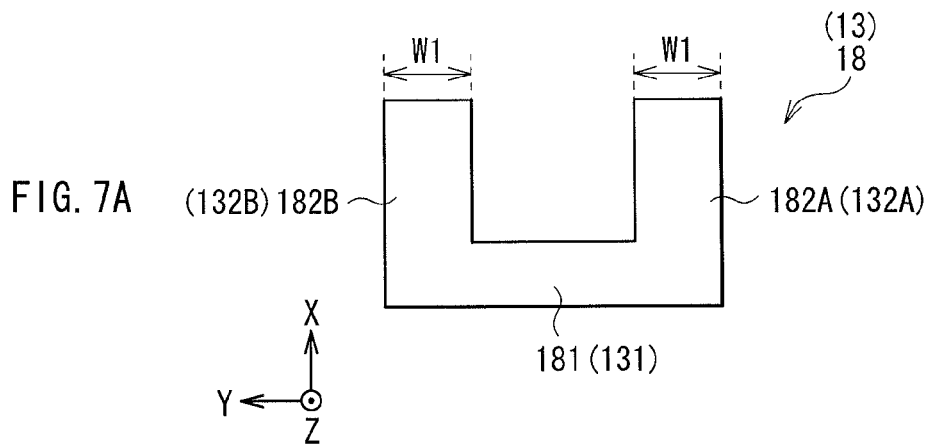
FIGS. 7A to 7D are schematic diagrams illustrating other examples of a planar shape of the polymer actuator device and the supporting member.
Figure 7B:
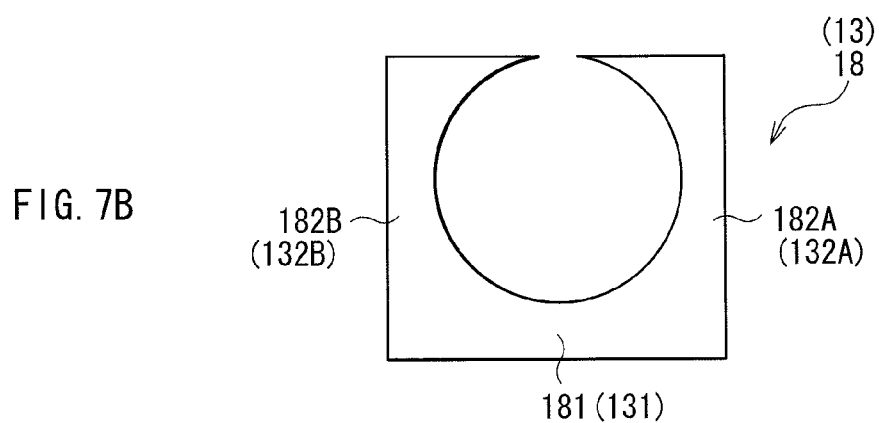
Figure 7C:
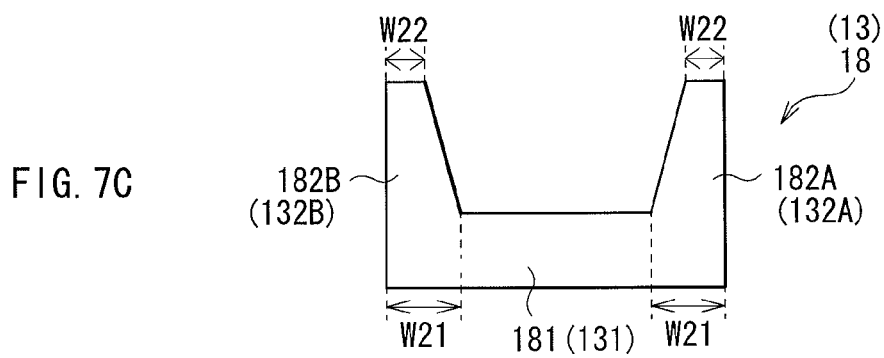

Herein, a planar shape (a shape of the X-Y plane) of one or both of such a supporting member and the polymer actuator device 13 is desirably as schematically illustrated in FIGS. 7A to 7D. Specifically, as illustrated in FIGS. 7A to 7C, the single supporting member 18 is desirably configured of a fixed portion 181 fixed by the fixing member 12 and a pair of protrusions 182A and 182B. The pair of protrusions 182A and 182B is provided on both ends of the fixed portion 181 (both ends along the Y-axis direction herein) and configures the supporting surface. In addition, for example, the polymer actuator device 13 is desirably configured of a fixed portion 131 fixed by the fixing member 12 and a pair of protrusions 132A and 132B. The pair of protrusions 132A and 132B is provided on both ends of the fixed portion 131 and configures the driving surface.

Figure 7D:
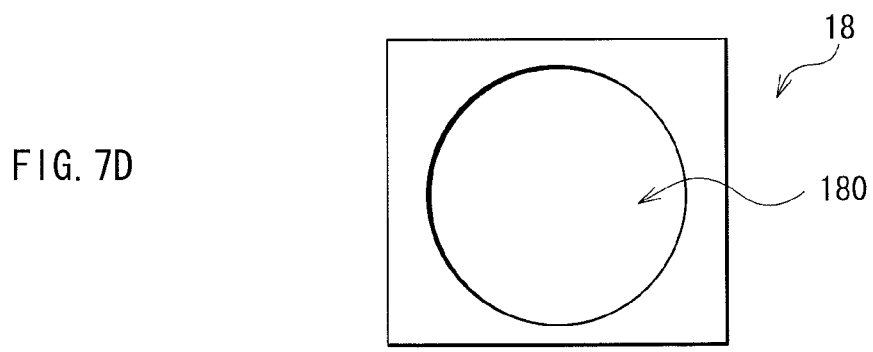

Specifically, for example, as illustrated in FIG. 7A, the planar shape of the supporting member 18 or the polymer actuator device 13 is desirably has a shape like a letter U. Accordingly, in the supporting member 18 or the polymer actuator device 13, variation of parallelism on the driving surface is reduced or avoided. Alternatively, for example, as illustrated in FIGS. 7B and 7D, an opening (a round-shaped opening herein) corresponding to the shape of the lens holding member 14 may be provided. Accordingly, the gap between the lens 40 and the lens holding member 14 is effectively used, and the torque (driving force) and displacement of the polymer actuator device 13 are increased as much as possible. Note that the above-described opening 130 of the polymer actuator device 13 is desirably as small as possible, but the opening of the supporting member 18 may be large like an opening 180 illustrated in FIG. 7D, for example. In addition, as illustrated in FIG. 7C, for example, the width of each of the protrusions 182A (132A) and 182B (132B) may be gradually decreased from the fixed portion 181 (131) side (width W21) toward the tip side (width W22) (width W21>width W22). In other words, the width W21 on the base side of each of the protrusions 182A (132A) and 182B (132B) may be equal to or larger than the width W22 on the tip side. As a result, a resonance frequency of the polymer actuator device 13 is set high, a frequency range which is automatically controllable is widened, and a space of a corner is effectively used. At this time, since the magnitude of the driving force of the polymer actuator device 13 is determined mainly by the width W21 on the base side, the driving force is little sacrificed even if the width W22 on the tip side is decreased.

Coupling Members 151A, 151B, and 152

Each of the coupling members 151A and 151B is a member coupling (connecting) a second end of each of the supporting members 18A and 18B to an end of the connection portion 14A, respectively. Specifically, the coupling member 151A couples between the lower end of the connection portion 14A and the second end of the supporting member 18A, and the coupling member 151B couples between the lower end of the connection portion 14A and the second end of the supporting member 18B. On the other hand, the coupling member 152 is a member coupling (connecting) a second end of the polymer actuator device 13 to an end of the connection portion 14A. Specifically, the coupling member 152 couples between the upper end of the connection portion 14A and the second end of the polymer actuator device 13. In this way, the second end of each of the polymer actuator device 13 and the supporting members 18A and 18B is indirectly connected to each end of the lens holding member 14 (the connection portion 14A).

Each of the coupling members 151A, 151B, and 152 is formed of a flexible film such as a polyimide film, and is desirably formed of a soft material having a rigidity (a bending rigidity) equivalent to or lower (preferably the same or lower) than that of the polymer actuator device 13. This is because flexibility allowing the coupling members 151A, 151B, and 152 to be curved in a direction opposite from the curvature direction of the supporting members 18A and 18B and the polymer actuator device 13 is generated. Consequently, although the detail will be described later, the cross-sectional shape of a cantilever configured by the polymer actuator device 13, the supporting members 18A and 18B, and the coupling members 151A, 151B, and 152 is curved like a letter S. As a result, the connection portion 14A becomes movable in parallel along the Z-axis direction, and the holding portion 14B (and the lens 40) is driven in the Z-axis direction while maintaining a parallel state with respect to the base member 11. Incidentally, as the bending rigidity in this case, the above-described spring constant represented by the above-described expressions (1) and (2) may be used. Moreover, the heatproof temperature of the coupling members 151A, 151B, and 152 is desirably equal to or higher than about 200° C., for example. As a result, the characteristics are not changed even after the high temperature process such as a reflow.

Figure 8:
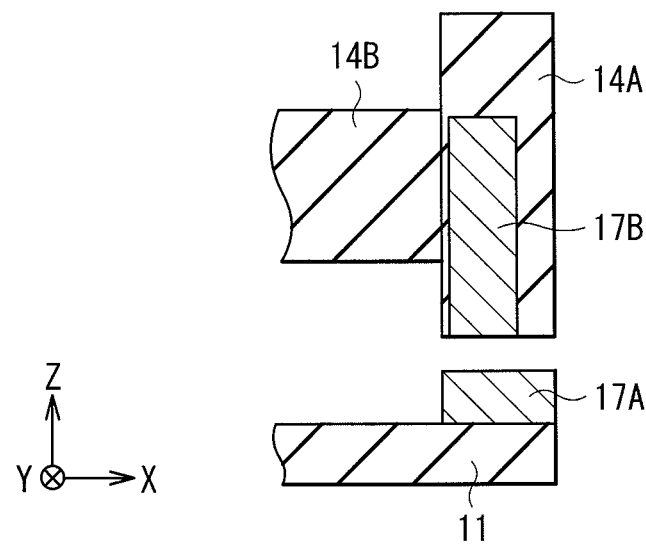
FIG. 8 is a schematic sectional view illustrating another example of an arrangement configuration of a Hall device.

Each of the Hall device 17A and the magnet 17B illustrated in FIGS. 3 and 4 is a device used for detecting a movement (displacement) of the lens holding section 14. Specifically, for example, as illustrated in FIG. 8, in the combination of the Hall device 17A and the magnet 17B, the magnet 17B may be provided inside the connection portion 14A. In this case, a space for providing the magnet 17B as illustrated in FIGS. 3 and 4 is unnecessary so that downsizing is achievable and sensitivity is improved.

Figure 11A:
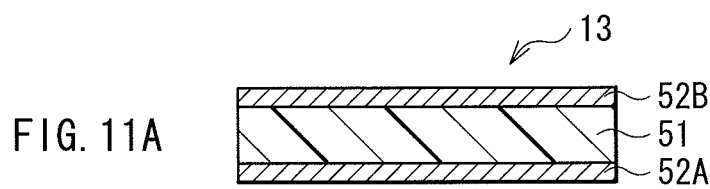
FIGS. 11A and 11B are schematic sectional views for explaining a basic operation of the polymer actuator device illustrated in FIG. 3.
Figure 11B:
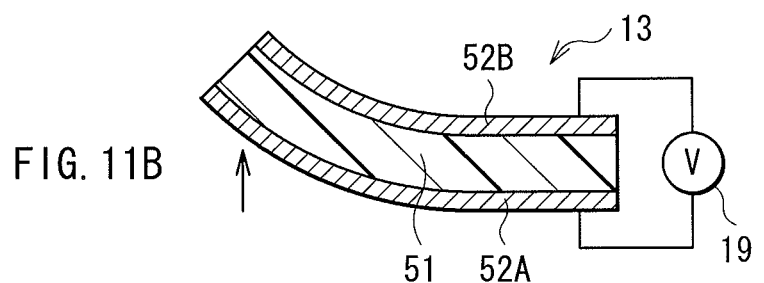

As illustrated in FIG. 5A, the voltage supply section 19 supplies the drive voltage Vd to the polymer actuator device 13 to drive (deform) the polymer actuator device 13. Such a voltage supply section 19 is configured of an electrical circuit using, for example, a semiconductor device. Note that the detail of the driving operation of the polymer actuator device 13 by the voltage supply section 19 will be described later (FIGS. 11A and 11B).

Detailed Configuration of Polymer Actuator Device
13

Next, the detailed configuration of the polymer actuator device 13 is described with referring to FIGS. 9 and 10. FIG. 9 illustrates a cross-sectional configuration (a Z-X cross-sectional configuration) of the polymer actuator device 13.

The polymer actuator device 13 has a cross-sectional configuration in which a pair of electrode films 52A and 2B is formed on both surfaces of an ion conductive polymer compound film 51 (hereinafter, simply referred to as a polymer compound film 51), respectively. In other words, the polymer actuator device 13 has the pair of electrode films 52A and 52B and the polymer compound film 51 interposed between the electrode films 52A and 52B. Incidentally, the polymer actuator device 13 and the electrode films 52A and 52B may be covered therearound with an insulating protection film made of a material with high elasticity (for example, polyurethane).

As illustrated by a sectional view (a Z-X sectional view) in FIG. 10, in the polymer actuator device 13, the electrode film 52A is electrically connected to the fixed electrode 130A on the central fixing member 12C side, and the electrode film 52B is electrically connected to the fixed electrode 130B on the upper fixing member 12U side. On the other hand, the supporting members 18A and 18B are interposed between the fixed electrode 130B on the lower fixing member 12D side and the fixed electrode 130A on the central fixing member 12C side. Incidentally, although not illustrated in FIG. 10, the members and the electrodes from the fixed electrode 130B on the lower fixing member 12 side up to the fixed electrode 130B on the upper fixing member 12U side are sandwiched and fixed by the pressing member 16 (a plate spring) illustrated in FIG. 4 with constant pressure. As a result, the polymer actuator device 13 and the supporting members 18A and 18B are not damaged even if being applied with large force, and stable electrical connection is possible even when the polymer actuator device 13 and the supporting members 18A and 18B are deformed.

The polymer compound film 51 is configured to be curved by a predetermined potential difference occurring between the electrode films 52A and 52B. The polymer compound film 51 is impregnated with an ionic substance. The "ionic substance" herein refers to ions in general capable of conducting through the polymer compound film 51. Specifically, the "ionic substance" indicates a simple substance of hydrogen ions or metal ions, a substance containing those cations and/or anions and a polar solvent, or a liquid substance containing cations and/or anions such as imidazolium salt. For example, as the former, there is a substance in which a polar solvent is solvated in cations and/or anions, and as the latter, there is an ionic liquid.

Examples of a material of the polymer compound film 51 include an ion-exchange resin in which a fluororesin or a hydrocarbon system is a skeleton. As the ion-exchange resin, it is preferable to use a cation-exchange resin when a cationic substance is impregnated, and use an anion-exchange resin when an anionic substance is impregnated.

As the cation-exchange resin, for example, a resin into which an acidic group such as a sulfonate group or a carboxyl group is introduced is exemplified. Specifically, the cation-exchange resin is polyethylene having an acidic group, polystyrene having an acidic group, a fluororesin having an acidic group, or the like. Above all, a fluororesin having a sulfonate group or a carboxylic acid group is preferable as the cation-exchange resin, and Nafion (made by E. I. du Pont de Nemours and Company) is exemplified.

The cationic substance impregnated in the polymer compound film 51 may be organic or inorganic, or any kind. For example, various kinds of substance such as a simple substance of metal ions, a substance containing metal ions and water, a substance containing organic cations and water, and an ionic liquid are applicable. Examples of the metal ion include light metal ion such as sodium ion ($Na^+$), potassium ion ($K^+$), lithium ion ($Li^+$), or magnesium ion ($Mg^{2+}$). Further, examples of the organic cation include alkylammonium ion. These cations exist as a hydrate in the polymer compound film 51. Therefore, in a case where the polymer compound film 51 is impregnated with the cationic substance containing cations and water, it is preferable to seal the cationic substance as a whole in order to suppress volatilization of the water, in the polymer actuator device 13.

The ionic liquid is also called ambient temperature molten salt, and contains cations and anions having low combustion and low volatility. Examples of the ionic liquid include an imidazolium ring system compound, a pyridinium ring system compound, and an aliphatic compound.

Each of the electrode films 52A and 52B facing each other with the polymer compound film 51 in between includes one or more kinds of conductive materials. Each of the electrode films 52A and 52B is preferably a film in which particles of conductive material powder are bound by an ionic conductive polymer in order to increase flexibility of the electrode films 52A and 52B. A carbon powder is preferable as the conductive material powder because the carbon powder has a high conductivity and a large specific surface area, thereby achieving a larger deformation amount. As the carbon powder, Ketjen black is preferable. As the ionic conductive polymer, a material similar to that of the polymer compound film 51 is preferable.

The electrode films 52A and 52B are formed in the following manner, for example. A coating material in which conductive material powder and an ionic conductive polymer are dispersed in a dispersion medium is applied to both surfaces of the polymer compound film 51, and then dried. Alternatively, a film-shaped substance containing conductive material powder and an ionic conductive polymer may be affixed to both surfaces of the polymer compound film 51 by pressure bonding.

The electrode films 52A and 52B may each have a multilayer structure, and in that case, each of the electrode films 52A and 52B preferably has such a structure that a layer in which particles of conductive material powder are bound by an ionic conductive polymer and a metal layer are stacked in order from the polymer compound film 51 side. This allows a potential to be closer to a further uniform value in an in-plane direction of the electrode films 52A and 52B, thereby achieving excellent deformability. Examples of a material of the metal layer include a noble metal such as gold and platinum. Although a thickness of the metal layer is arbitrary, a continuous film allowing the potential to be uniform in the electrode films 52A and 52B is preferable. Examples of a method of forming the metal layer include plating, deposition, and sputtering.

The size (the width and the length) of the polymer compound film 51 may be freely set, according to the size and the weight of the lens holding member 14, the lens 40, and the like, or displacement (deformation amount) necessary for the polymer compound film 51. The displacement of the polymer compound film 51 is set according to, for example, a desired displacement (a movement along the Z-axis direction) of the object to be driven.

Functions and Effects of Image Pickup Unit 2

Subsequently, functions and effects of the image pickup unit 2 according to the embodiment will be described.

1. Operation of Polymer Actuator Device 13

First, operation of the polymer actuator device 13 is described with reference to FIGS. 11A and 11B. FIGS. 11A and 11B are sectional views schematically illustrating the operation of the polymer actuator device 13.

First, a case where a substance containing cations and a polar solvent is used as the cationic substance is described.

In this case, the cationic substance disperses approximately uniformly in the polymer compound film 51, and thus the polymer actuator device 13 in a state of no voltage application becomes flat without curving (FIG. 11A). Here, when a voltage applied state is established by the voltage supply section 19 illustrated in FIG. 11B (application of the drive voltage Vd begins), the polymer actuator device 13 exhibits the following behavior. For example, when the predetermined drive voltage Vd is applied between the electrode films 52A and 52B so that the electrode film 52A is at a negative potential whereas the electrode film 52B is at a positive potential, the cations in a state of being solvated in the polar solvent move to the electrode film 52A side. At this time, anions hardly move in the polymer compound film 51, and thus in the polymer compound film 51, the electrode film 52A side swells while the electrode film 52B side shrinks. As a result, the polymer actuator device 13 as a whole curves toward the electrode film 52B side, as illustrated in FIG. 11B. After that, when the state of no voltage application is established by eliminating the potential difference between the electrode films 52A and 52B (the application of the drive voltage Vd is stopped), the cationic substance (the cations and the polar solvent) localized to the electrode film 52A side in the polymer compound film 51 disperse, and the polymer actuator device 13 returns to the state illustrated in FIG. 11A. Further, when the predetermined drive voltage Vd is applied between the electrode films 52A and 52B so that the electrode film 52A shifts to a positive potential and the electrode film 52B shifts to a negative potential, from the state of no voltage application illustrated in FIG. 11A, the cations in the state of being solvated in the polar solvent move to the electrode film 52B side. In this case, in the polymer compound film 51, the electrode film 52A side shrinks while the electrode film 52B side swells, and thus the polymer actuator device 13 as a whole curves toward the electrode film 52A side.

Next, a case where an ionic liquid containing liquid cations is used as the cationic substance is described.

Also in this case, in the state of no voltage application, the ionic liquid is dispersed in the polymer compound film 51 approximately uniformly, and thus the polymer actuator device 13 becomes flat as illustrated in FIG. 11A. Here, when a voltage applied state is established by the voltage supply section 19 (application of the drive voltage Vd begins), the polymer actuator device 13 exhibits the following behavior. For example, when the predetermined drive voltage Vd is applied between the electrode films 52A and 52B so that the electrode film 52A is at a negative potential whereas the electrode film 52B is at a positive potential, the cations in the ionic liquid move to the electrode film 52A side, but anions hardly move in the polymer compound film 51 which is a cation-exchange membrane. For this reason, in the polymer compound film 51, the electrode film 52A side swells while the electrode film 52B side shrinks. As a result, the polymer actuator device 13 as a whole curves toward the electrode film 52B side, as illustrated in FIG. 11B. After that, when the state of no voltage application is established by eliminating the potential difference between the electrode films 52A and 52B (the application of the drive voltage Vd is stopped), the cations localized to the electrode film 52A side in the polymer compound film 51 disperse, and the polymer actuator device 13 returns to the state illustrated in FIG. 11A. Further, when the predetermined drive voltage Vd is applied between the electrode films 52A and 52B so that the electrode film 52A shifts to a positive potential and the electrode film 52B shifts to a negative potential, from the state of no voltage application illustrated in FIG. 11A, the cations in the ionic liquid move to the electrode film 52B side. In this case, in the polymer compound film 51, the electrode film 52A side shrinks whereas the electrode film 52B side swells, and thus the polymer actuator device 13 as a whole curves toward the electrode film 52A side.

2. Operation of Lens Module 4

Next, operation of the entire image pickup unit 2 (lens module 4) is described in detail with reference to FIGS. 12A to 15B, compared with comparative examples (comparative examples 1 to 3). FIG. 12A to FIG. 14 each illustrate configuration and operation of lens modules (lens modules 100 to 300) in an image pickup unit according to the comparative examples 1 to 3, respectively. On the other hand, FIGS. 15A and 15B each illustrate the operation of the lens module 4 in the image pickup unit 2 according to the embodiment, using a side view (a Z-X side view), where FIG. 15A illustrates a state before the operation and FIG. 15B illustrates a state after the operation.

Comparative Example 1

Figure 12A:
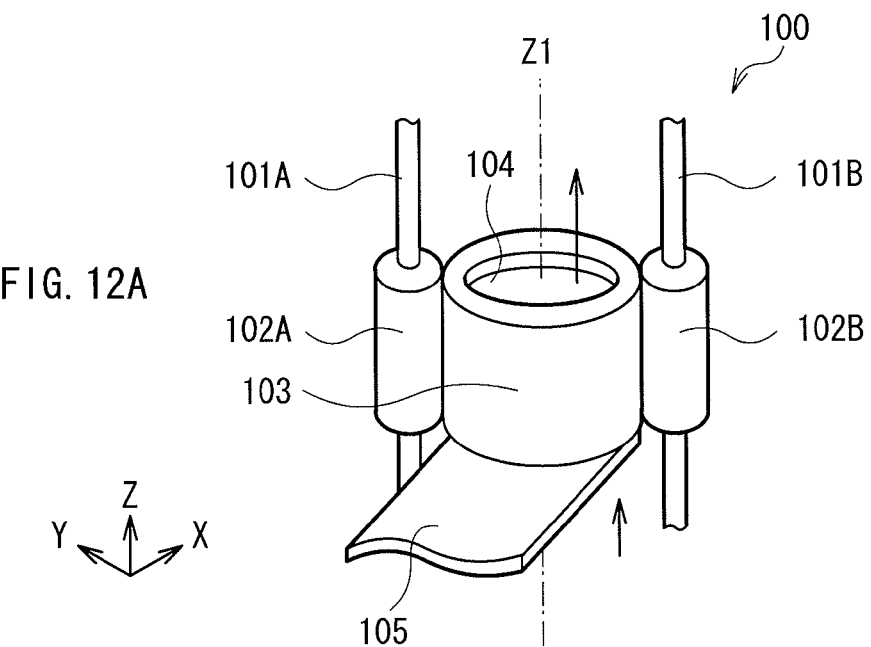
FIGS. 12A and 12B are schematic diagrams for explaining a configuration and an operation of a lens module according to a comparative example 1.

In the lens module 100 according to the comparative example 1 illustrated in FIG. 12A, a lens holding member 103 and a lens 104 are moved along the optical axis Z1 (in parallel with the optical axis Z1) with use of guide portions 101A, 101B, 102A, and 102B. Specifically, the lens holding member 103 is driven by a plate-like polymer actuator device 105.

Figure 12B:
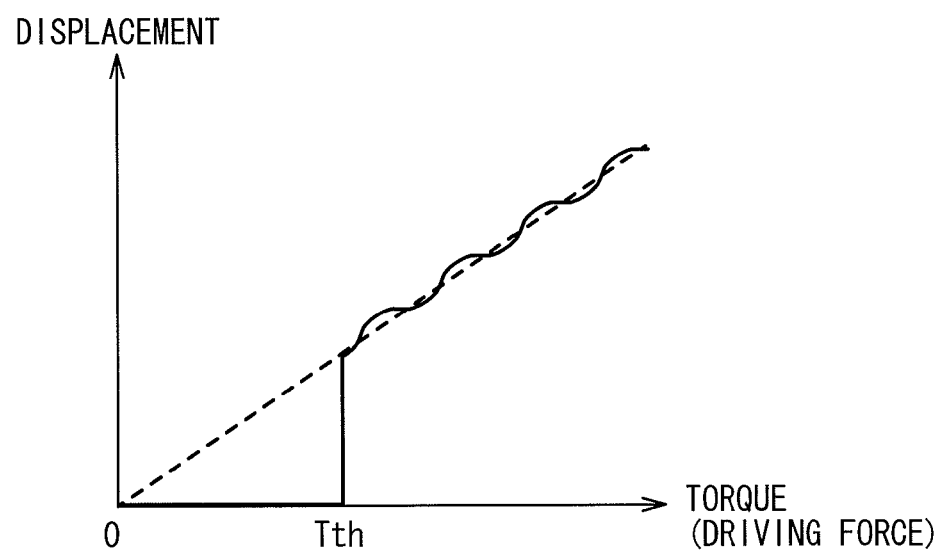

In the lens module 100, however, torque (driving force) of the polymer actuator device 105 is not sufficiently large value with respect to friction at the guide portions 101A, 101B, 102A, and 102B. Accordingly, in the comparative example 1, the moving operation of the lens 104 may be varied. Specifically, for example, as illustrated in FIG. 12B, the lens hardly moves until the driving force reaches a certain value (a threshold Tth), whereas the lens rapidly moves immediately after the driving force exceeds the threshold Tth, or thereafter, the lens moves unsteadily (nonlinearly) with respect to the increase of the driving force.

Comparative Example 2

Figure 13:
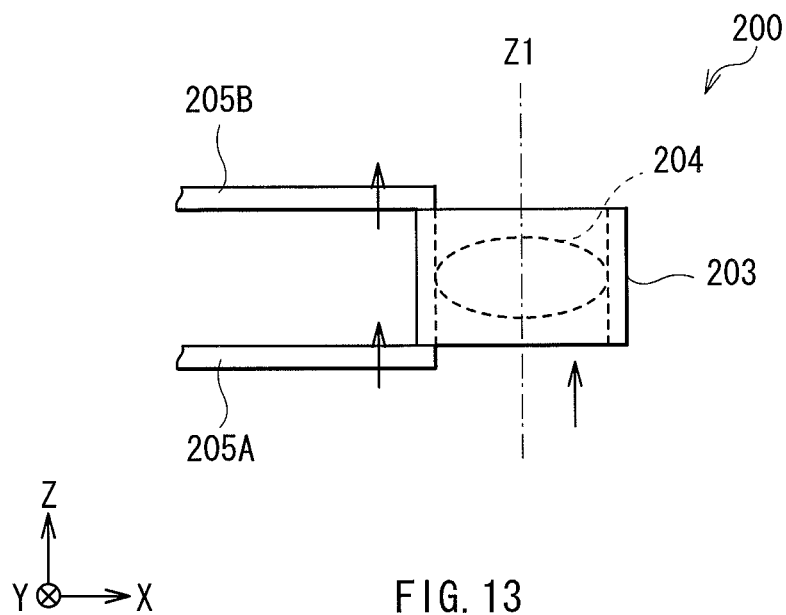
FIG. 13 is a schematic diagram for explaining a configuration and an operation of a lens module according to a comparative example 2.

On the other hand, in the lens module 200 according to the comparative example 2 illustrated in FIG. 13, a pair of plate-like polymer actuator devices 205A and 205B is oppositely disposed above and beneath a lens holding member 203, along the optical axis Z1 of a lens 204 (parallel plate type).

In the lens module 200, however, it is difficult to move the lens 204 along the optical axis Z1 while maintaining the lens 204 to be in a parallel state. In other words, a case where the lens 204 does not operate in parallel with the optical axis Z1 may occur.

Comparative Example 3

Figure 14:
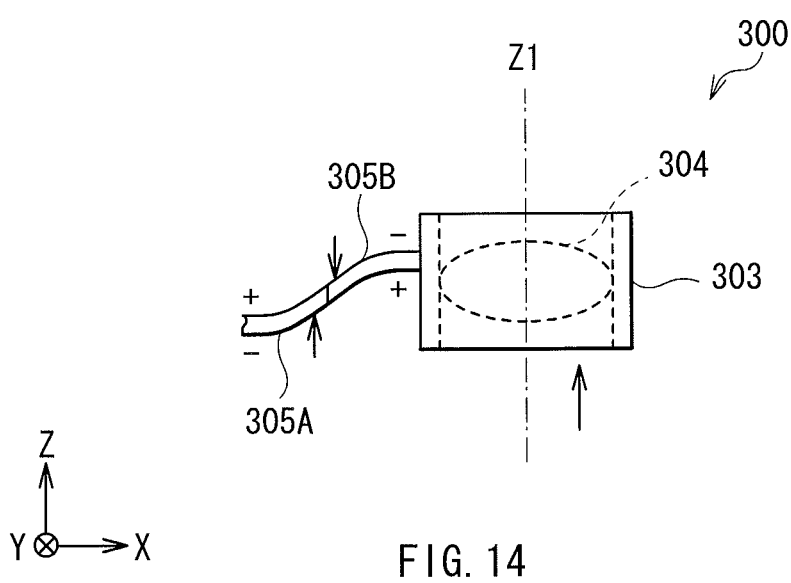
FIG. 14 is a schematic diagram for explaining a configuration and an operation of a lens module according to a comparative example 3.

In the lens module 300 according to the comparative example 3 illustrated in FIG. 14, as illustrated in the figure, a pair of polymer actuator devices 305A and 305B is combined. In the polymer actuator devices 305A and 305B, polarities of voltages applied thereto are different from each other, and thus the curvature directions are different from each other. Accordingly, a lens holding member 303 and a lens 304 are moved in the optical axis Z1 direction.

Also in the lens module 300, however, it is difficult to move the lens 304 in the optical axis direction Z1 in the case where the operational variation (variation of the deformation amount) caused by the characteristic variation and the like occurs between the pair of polymer actuator devices 305A and 305B. In other words, the lens 304 may not operate in parallel with the optical axis Z1 or the lens 304 may incline with respect to the optical axis Z1.

As described above, in the lens modules 100 to 300 of the comparative examples 1 to 3 (a lens driving unit with use of a polymer actuator device according to any of the comparative examples 1 to 3), it is difficult to move the lens 40 to be driven with high accuracy (to move the lens 40 along the optical axis Z1 of the lens with high accuracy).

Embodiment

In contrast, in the lens module 4 of the image pickup unit 2 according to the embodiment, the lens 40 to be driven is driven as illustrated in FIGS. 3, 4, and 15A and 15B. Specifically, the second end side (movable side) of the polymer actuator device 13 is deformed (curved), and in association therewith, the second end side of the supporting members 18A and 18B (or the supporting member 18) is also deformed (curved), and therefore the lens holding member 14 is driven. As a result, the lens 40 becomes movable (displaceable). Specifically, in this case, the lens 40 becomes movable along the optical axis Z1 thereof.

At this time, in the embodiment, the polymer actuator device 13 is provided only on one side (an upper side) of the lens 40, and the supporting members 18A and 18B are provided on the other side (a lower side) of the lens 40 (the polymer actuator device is not provided). Therefore, unlike the case where a plurality of polymer actuator devices is used (corresponding to the comparative examples 2 and 3), characteristic variation (variation of the deformation amount and the like) does not occur between the plurality of devices. Accordingly, in the lens module 4 of the embodiment, compared with the comparative examples 1 to 3, the lens 40 to be driven is easily moved while maintaining the parallel state. Specifically, the holding portion 14B (and the lens 40) is easily driven in the Z-axis direction while maintaining the parallel state with respect to the base member 11. In other words, the lens 40 is easily moved along the optical axis Z1.

At this time, the lens holding member 14 is driven through the coupling members 151A, 151B, and 152. As a result, as illustrated in FIG. 15B, the holding portion 14B (and the lens 40) is easily driven in the Z-axis direction while maintaining the parallel state with respect to the base member 11. In other words, the lens 40 is easily moved along the optical axis Z1.

In addition, in the embodiment, the lens holding member 14 is driven through the coupling members 151A, 151B, and 152, and the coupling members 151A, 151B, and 152 each have a rigidity equal to or smaller than that of the polymer actuator device 13. Then, the polymer actuator device 13 and the supporting members 18A and 18B are displaced toward the same direction. Accordingly, flexibility allowing the coupling members 151A, 151B, and 152 to be curved in a direction opposite from the curvature direction of the polymer actuator device 13 is generated. Therefore, the cross-sectional shape of the cantilever configured by the polymer actuator device 13 and the coupling members 151A, 151B, and 152 is curved like a letter S. As a result, the connection portion 14A becomes movable in parallel along the Z-axis direction, and the holding portion 14B (and the lens 40) is easily driven in the Z-axis direction (the lens 40 becomes more easily movable along the optical axis Z1 thereof) while maintaining a parallel state with respect to the base member 11.

As described above, in the embodiment, the polymer actuator device 13 is provided on the one side of the lens 40, and the supporting members 18A and 18B are provided on the other side of the lens 40. Therefore, the lens 40 becomes easily movable while maintaining the parallel state. As a result, the lens 40 is allowed to be moved with high accuracy (herein, the lens 40 is allowed to be moved with high accuracy along the optical axis Z1 direction thereof). Consequently, accurate focusing, zooming, and the like are performed, and thus sufficient optical characteristics are obtainable.

Modifications

Hereinbefore, although the technology of the disclosure has been described with referring to the embodiment, the technology is not limited thereto, and various modifications may be made.

For example, the connection portion 14A and the coupling members 151A, 151B, and 152 described in the embodiment may not be provided depending on circumstances. Specifically, for example, the second end of each of the polymer actuator device 13 and the supporting members 18A and 18B (or the supporting member 18) may be directly connected to the end of the lens holding member 14 (or the holding portion 14B).

In addition, in the above-described embodiment, described is the case where the first end of the polymer actuator device 13 is directly fixed by the fixing member 12, however, this is not limitative. Alternatively, for example, one end of a polymer actuator device may be indirectly fixed by a fixing member (through a fixed electrode or the like).

Further, the shape, the material, and the like of the polymer actuator device and the supporting members are not limited to those described in the embodiment, and the laminated structure of the polymer actuator device is also not limited to that described in the embodiment and the like, and is appropriately modified. For example, depending on the circumstances, the coupling members may be formed of a material having a bending rigidity larger than that of each polymer actuator device. In addition, the shape, the material, and the like of the other members in the lens module (drive unit) are also not limited to those described in the embodiment.

In addition, in the above-described embodiment, the lens drive unit driving a lens to be driven along the optical axis thereof has been described as an example of the drive unit of the disclosure, but this is not limitative. For example, the lens drive unit may drive the lens along a direction orthogonal to the optical axis. Moreover, the drive unit of the disclosure is applicable to the drive unit or the like which drives the other object to be driven such as a diaphragm (see Japanese Unexamined Patent Application Publication No. 2008-259381). Furthermore, the drive unit, the lens module, and the image pickup unit of the disclosure are applicable to various electronic units other than the mobile phone described in the embodiment.

Note that the technology may be configured as follows.

(1) A drive unit including:

a holding member holding an object to be driven;

a polymer actuator device provided on one side of the object to be driven;

one or more supporting members provided on the other side of the object to be driven; and a fixing member directly or indirectly fixing a first end of each of the polymer actuator device and the supporting members, wherein a second end of each of the polymer actuator device and the supporting members is directly or indirectly connected to an end of the holding member.

(2) The drive unit according to (1), wherein the polymer actuator device has a bending rigidity substantially equal to a bending rigidity of each of the supporting members.

(3) The drive unit according to (2), wherein each of the supporting members has a longitudinal elastic modulus larger than a longitudinal elastic modulus of the polymer actuator device.

(4) The drive unit according to (3), wherein an area of a driving surface of the polymer actuator device is larger than an area of a supporting surface of the supporting members.

(5) The drive unit according to (4), wherein the polymer actuator device has a first opening formed in a region opposing to the object to be driven.

(6) The drive unit according to any one of (1) to (5), further including coupling members coupling the second end of each of the polymer actuator device and the supporting members with the end of the holding member.

(7) The drive unit according to (6), wherein the holding member includes a holding portion and a connection portion, the holding portion being provided between the driving surface of the polymer actuator device and the supporting surface of the supporting members and holding the object to be driven, and the connection portion supporting the holding portion and connecting the holding portion and the coupling members.

(8) The drive unit according to (7), wherein the fixing member is formed with a second opening allowing the holding portion to be partially inserted therethrough.

(9) The drive unit according to any one of (6) to (8), wherein one or both of the supporting member and the polymer actuator device have a fixed portion fixed by the fixing member and a pair of protrusions, the pair of protrusions being provided on both ends of the fixed portion and configuring the driving surface of the polymer actuator device or the supporting surface of the supporting members.

(10) The drive unit according to (9), wherein a width of each of the protrusions is gradually decreased from the fixed portion side toward a tip side.

(11) The drive unit according to any one of (6) to (10), wherein each of the coupling members has a bending rigidity equal to or smaller than a bending rigidity of the polymer actuator device.

(12) The drive unit according to (11), wherein each of the coupling members is formed of a flexible film.

(13) The drive unit according to any one of (1) to (12), wherein corners of the fixing member on movable end sides of the polymer actuator device and the supporting member are chamfered.

(14) The drive unit according to any one of (1) to (13), wherein the polymer actuator device includes a pair of electrode films and a polymer film interposed between the pair of electrode films.

(15) The drive unit according to any one of (1) to (14), wherein
the object to be driven is a lens, and
the drive unit is configured as a lens drive unit driving the lens.

(16) The drive unit according to (15), wherein a driving surface of the polymer actuator device faces a supporting surface of the supporting member along an optical axis of the lens.

(17) A lens module including a lens and a drive unit driving the lens, the drive unit including:
a holding member holding the lens;
a polymer actuator device provided on one side of the lens;
one or more supporting members provided on the other side of the lens; and
a fixing member directly or indirectly fixing a first end of each of the polymer actuator device and the supporting members, wherein
a second end of each of the polymer actuator device and the supporting members is directly or indirectly connected to an end of the holding member.

(18) An image pickup unit including a lens, an image pickup device acquiring an image pickup signal imaged by the lens, and a drive unit driving the lens, the drive unit including:
a holding member holding the lens;
a polymer actuator device provided on one side of the lens;
one or more supporting members provided on the other side of the lens; and
a fixing member directly or indirectly fixing a first end of each of the polymer actuator device and the supporting members, wherein a second end of each of the polymer actuator device and the supporting members is directly or indirectly connected to an end of the holding member.

The present application contains subject matter related to that disclosed in Japanese Priority Patent Application JP 2011-185529 filed in the Japan Patent Office on Aug. 29, 2011, the entire content of which is hereby incorporated by reference.

It should be understood by those skilled in the art that various modifications, combinations, sub-combinations, and alterations may occur depending on design requirements and other factors insofar as they are within the scope of the appended claims or the equivalents thereof.

What is claimed is:

1. A drive unit comprising:
a holding member holding an object to be driven;
a polymer actuator device provided on one side of the object to be driven;
one or more supporting members provided on another side of the object to be driven; and
a fixing member directly or indirectly fixing a first end of each of the polymer actuator device and the one or more supporting members, wherein
a second end of each of the polymer actuator device and the one or more supporting members is directly or indirectly connected to an end of the holding member,
wherein the polymer actuator device has a bending rigidity substantially equal to a bending rigidity of each of the one or more supporting members.

2. The drive unit according to claim 1, wherein
each of the one or more supporting members has a longitudinal elastic modulus larger than a longitudinal elastic modulus of the polymer actuator device.

3. The drive unit according to claim 1, wherein
an area of a driving surface of the polymer actuator device is larger than an area of a supporting surface of the one or more supporting members.

4. The drive unit according to claim 1, wherein
the polymer actuator device has a first opening formed in a region opposing to the object to be driven.

5. The drive unit according to claim 1, wherein
corners of the fixing member on movable end sides of the polymer actuator device and the one or more supporting members are chamfered.

6. The drive unit according to claim 1, wherein
the polymer actuator device comprises a pair of electrode films and a polymer film interposed between the pair of electrode films.

7. The drive unit according to claim 1, wherein
the object to be driven is a lens, and
the drive unit is configured as a lens drive unit driving the lens.

8. The drive unit according to claim 7, wherein
a driving surface of the polymer actuator device faces a supporting surface of the one or more supporting members along an optical axis of the lens.

9. A drive unit comprising
a holding member holding an object to be driven;
a polymer actuator device provided on one side of the object to be driven;
one or more supporting members provided on another side of the object to be driven;
a fixing member directly or indirectly fixing a first end of each of the polymer actuator device and the one or more supporting members; and coupling members coupling a second end of each of the polymer actuator device and the one or more supporting members with an end of the holding member, wherein
the second end of each of the polymer actuator device and the one or more supporting members is directly or indirectly connected to the end of the holding member.

10. The drive unit according to claim 9, wherein
the holding member comprises a holding portion and a connection portion, the holding portion being provided between a driving surface of the polymer actuator device and a supporting surface of the one or more supporting members and holding the object to be driven, and the connection portion supporting the holding portion and connecting the holding portion and the coupling members.

11. The drive unit according to claim 10, wherein
the fixing member is formed with a second opening allowing the holding portion to be partially inserted there through.

12. The drive unit according to claim 9, wherein
the one or more supporting members and the polymer actuator device have a fixed portion fixed by the fixing member and a pair of protrusions, the pair of protrusions being provided on both ends of the fixed portion and configuring a driving surface of the polymer actuator device or a supporting surface of the one or more supporting members.

13. The drive unit according to claim 12, wherein
a width of each of the protrusions is gradually decreased from the fixed portion side toward a tip side.

14. The drive unit according to claim 9, wherein
each of the coupling members has a bending rigidity equal to or smaller than a bending rigidity of the polymer actuator device.

15. The drive unit according to claim 14, wherein
each of the coupling members is formed of a flexible film.

16. A lens module including a lens and a drive unit driving the lens, the drive unit comprising:
a holding member holding the lens;
a polymer actuator device provided on one side of the lens;
one or more supporting members provided on another side of the lens; and
a fixing member directly or indirectly fixing a first end of each of the polymer actuator device and the one or more supporting members, wherein
a second end of each of the polymer actuator device and the one or more supporting members is directly or indirectly connected to an end of the holding member,
wherein the polymer actuator device has a bending rigidity substantially equal to a bending rigidity of each of the one or more supporting members.

17. An image pickup unit including a lens, an image pickup device acquiring an image pickup signal imaged by the lens, and a drive unit driving the lens, the drive unit comprising:
a holding member holding the lens;
a polymer actuator device provided on one side of the lens;
one or more supporting members provided on another side of the lens;
a fixing member directly or indirectly fixing a first end of each of the polymer actuator device and the one or more supporting members; and
coupling members coupling a second end of each of the polymer actuator device and the one or more supporting members with an end of the holding member.

* * * * *